Nov. 1, 1932.  L. M. FABBRO  1,885,697
VAPORIZER AND SUPERCHARGER FOR INTERNAL COMBUSTION ENGINES
Filed Oct. 11, 1929  3 Sheets-Sheet 1
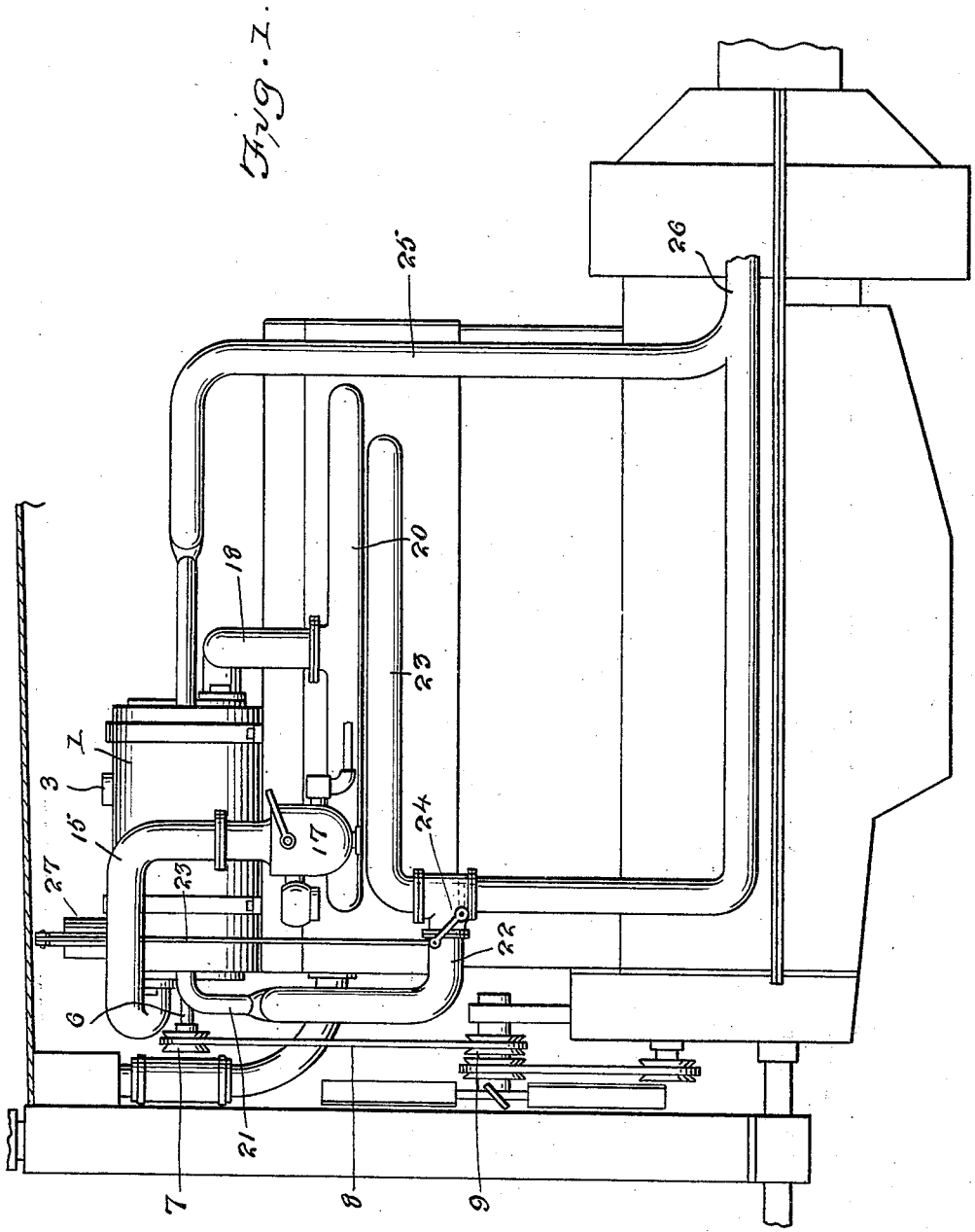
Louis M. Fabbro
INVENTOR
BY Victor J. Evans
ATTORNEY Nov. 1, 1932.  L. M. FABBRO  1,885,697
VAPORIZER AND SUPERCHARGER FOR INTERNAL COMBUSTION ENGINES
Filed Oct. 11, 1929   3 Sheets-Sheet 2
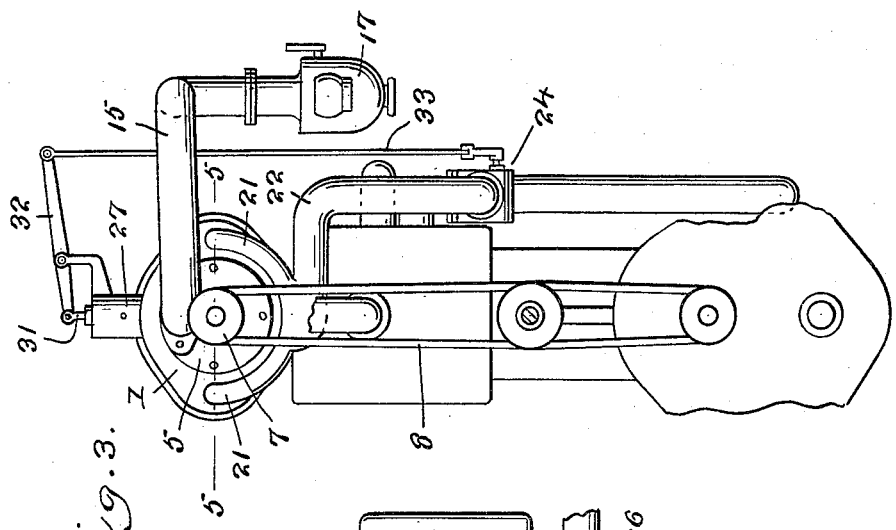
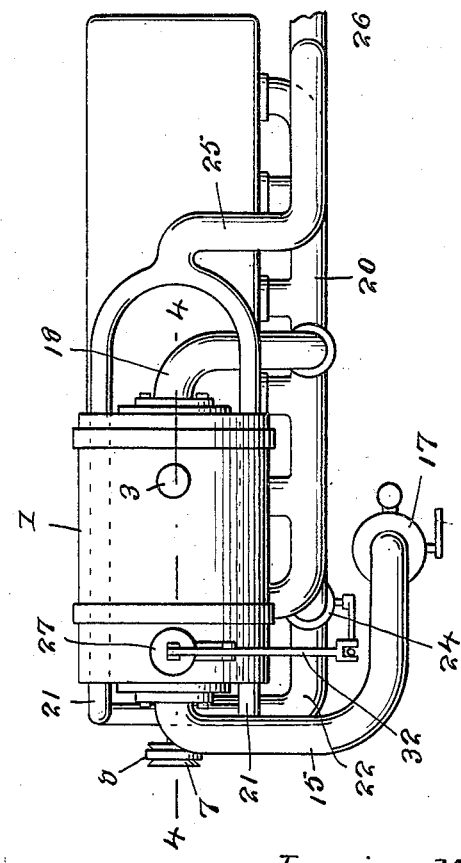
Louis M. Fabbro
INVENTOR
BY *Victor J. Evans*
ATTORNEY

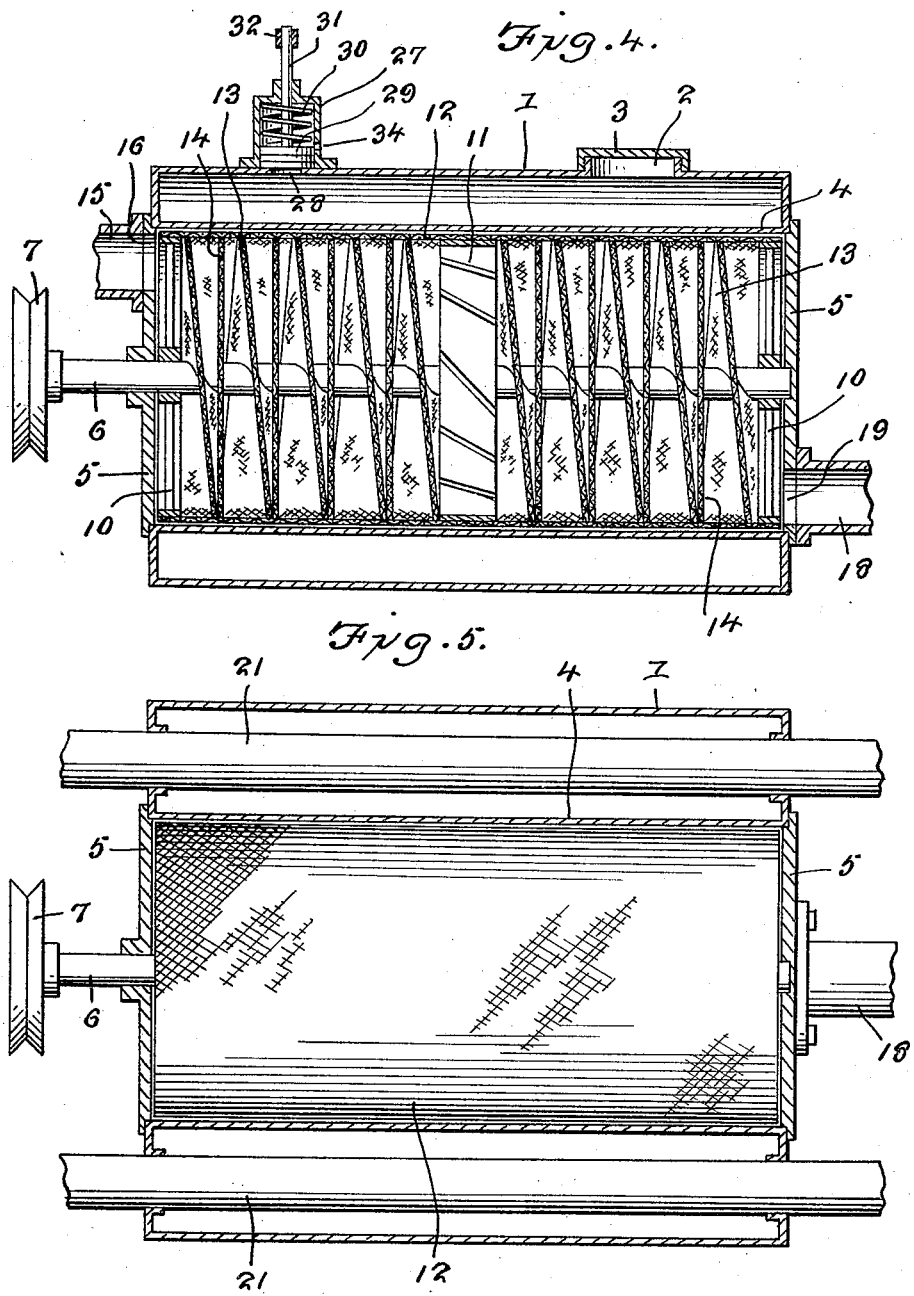

Patented Nov. 1, 1932

1,885,697

UNITED STATES PATENT OFFICE

LOUIS M. FABBRO, OF CLEVELAND, OHIO, ASSIGNOR OF FORTY-FIVE PER CENT TO ANNA M. FABBRO, AND FORTY PER CENT TO E. C. BALZHISER, BOTH OF CLEVELAND, OHIO, AND FIFTEEN PER CENT TO CHARLES DI LORENZIO

VAPORIZER AND SUPERCHARGER FOR INTERNAL COMBUSTION ENGINES

Application filed October 11, 1929. Serial No. 399,029.

This invention relates to a vaporizer and supercharger for internal combustion engines, the general object of the invention being to provide means for heating and thoroughly vaporizing the explosive mixture as it passes from the carburetor to the cylinders so as to greatly increase the efficiency of the engine by increasing the combustibility of the charge, greatly increasing the miles per gallon, preventing overheating of the engine and otherwise securing the maximum efficiency with the minimum amount of fuel.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of an engine, showing the invention applied thereto.

Figure 2 is a top plan view.

Figure 3 is a front view.

Figure 4 is a section on line 4—4 of Figure 2.

Figure 5 is a section on line 5—5 of Figure 3.

In these views, the numeral 1 indicates a tank suitably attached to the engine, preferably on the top thereof, and provided with a filling opening 2 closed by a cap 3, so that the tank may be filled with water. The tank has a cylindrical bore 4 passing therethrough, the ends of which are closed by the covers 5. A shaft 6 is journaled in the covers, with the front end of the shaft projecting, and this projecting end has a pulley 7 thereon which is adapted to be connected by a belt 8 with a pulley 9 on the fan shaft of the motor. Spiders 10 are connected with the shaft and are located adjacent the ends of the bore and a fan 11 is connected with the shaft and is arranged at the center of the bore. A perforated cylinder 12, preferably formed of wire mesh, is connected with the spiders and fan and a spiral 13, formed of wire mesh, is connected with the shaft and the cylinder 12 on each side of the fan 11. Baffles 14, also formed of wire mesh or gauze, are connected with the shaft and cylinder and are arranged between the convolutions of the spirals. Thus the cylinder 12, the two spirals 13, the baffles 14 and the fan all rotate within the bore of the tank with the shaft.

A pipe 15 connects a port 16 in the front cover 5 with the carburetor 17 and a pipe 18 connects a port 19 in the rear cover 5 with the intake manifold 20 so that the mixture from the carburetor passes through the pipe 15 into the port 16 into the bore of the tank, where it is subjected to the rotative action of the spirals and fan and thus forced through the port 19 and pipe 18 into the manifold.

A number of pipes 21 pass through the water space of the tank and the front ends of these pipes are connected to a pipe 22 which is connected with the exhaust manifold 23 and contains a valve 24. The rear ends of the pipes 21 are connected by a pipe 25 with the exhaust pipe 26. Thus the exhaust gases passing through the pipes 21 will heat the water in the tank.

A small cylinder 27 is connected with the top of the tank and is in communication therewith through the port 28 and a piston 29 is arranged in the cylinder and is normally pressed against the port carrying part 28 by a spring 30. The piston rod 31 is connected with a lever 32 which in turn is connected by a link 33 with the arm of the valve 24, these parts being so arranged that as the piston 29 is forced upwardly by the expansion of the hot water or steam in the tank, the lever and link will cause the valve 24 to close and thus prevent the exhaust gases from passing through the pipes in the tank. Thus these parts act as a regulator for controlling the temperature of the water in the tank, for as soon as the water reaches a certain degree, the valve 24 will close and thus prevent the exhaust gases from passing through the pipes in the tank to prevent the water from being overheated. As soon as the water cools, the piston will drop and the valve will open again so that the exhaust gases will again flow through the pipes in the tank.

A vent 34 is formed in the cylinder 27 and if the water in the tank should become overheated through failure of the valve operating means to operate for any reason, the pressure in the tank would cause the piston to pass above the vent and thus steam or water would pass through the vent so that this vent and piston acts as a safety means for preventing overheating of the water in the tank if the other means should fail to operate.

From the foregoing it will be seen that I have provided means for heating the explosive mixture as it passes through the bore of the tank and the rotating cylinder 12 and its associated parts will thoroughly mix the charge as it passes through the device and any drops of fuel will be broken up. The mixture is first operated on by the first spiral 13 and then the mixture is acted on by the fan 11 and after passing the fan, the mixture is acted on again by the second spiral. The mixture is caused to pass through the perforations of the spirals and the baffles so that it is thoroughly mixed and vaporized and as the cylinder 12 is formed of foraminated material, the mixture can pass through the same and thus come in direct contact with the hot walls of the bore forming part 4. Thus the mixture is thoroughly agitated, solid portions broken up and mixed with the air, the mixture is heated and the mixture is forced by the rotating parts into the pipe 18 through the manifold into the cylinders. Thus the mixture reaches the cylinders of the engine in a highly explosive condition, so that the engine will start quickly, and the greatest amount of efficiency is secured with the minimum amount of fuel. As before stated, the temperature of the water in the tank is automatically controlled and safety means are provided if the controlling means should fail to act for any reason.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with an internal combustion engine, including its carburetor and the inlet and exhaust manifolds, a tank attached to the engine and adapted to contain a liquid, said tank having a cylindrical bore, the ends of which are closed, a cylinder of foraminous material arranged in the bore, a shaft passing through the bore, means for supporting the cylinder from the shaft, a fan midway the ends of the shaft and connected with the shaft, a spiral connected with the shaft on each side of the fan and formed of foraminous material, said spirals also being connected with the cylinder, baffles of foraminous material connected with the shaft and cylinder and arranged between the convolutions of the spirals, means for rotating the shaft from a movable part of the engine, a pipe connecting the front end of the bore with the carbureter, a pipe connecting the rear end of the bore with the inlet manifold, pipes passing through the tank, a pipe connecting said pipes with the exhaust manifold, a discharge pipe connected with the other ends of the tank pipes, whereby the exhaust gases will pass through the tank pipes and heat the liquid therein and thus heat the explosive mixture passing through the device.

2. In combination with an internal combustion engine, including its carburetor and the inlet and exhaust manifolds, a tank attached to the engine and adapted to contain a liquid, said tank having a cylindrical bore, the ends of which are close, a cylinder of foraminous material arranged in the bore, a shaft passing through the bore, means for supporting the cylinder from the shaft, a fan midway the ends of the shaft and connected with the shaft, a spiral connected with the shaft on each side of the fan and formed of foraminous material, said spirals also being connected with the cylinder, baffles of foraminous material connected with the shaft and cylinder and arranged between the convolutions of the spirals, means for rotating the shaft from a movable part of the engine, a pipe connecting the front end of the bore with the carbureter, a pipe connecting the rear end of the bore with the inlet manifold, pipes passing through the tank, a pipe connecting said pipes with the exhaust manifold, a discharge pipe connected with the other ends of the tank pipes, whereby the exhaust gases will pass through the tank pipes and heat the liquid therein and thus heat the explosive mixture passing through the device and means for automatically regulating the flow of exhaust gases through the tank pipes by the temperature of the liquid within the tank.

3. In combination with an internal combustion engine, including its carbureter and the inlet and exhaust manifolds, a tank attached to the engine and adapted to contain a liquid, said tank having a cylindrical bore, the ends of which are closed, a cylinder of foraminous material arranged in the bore, a shaft passing through the bore, means for supporting the cylinder from the shaft, a fan midway the ends of the shaft and connected with the shaft, a spiral connected with the shaft on each side of the fan and formed of foraminous material, said spirals also being connected with the cylinder, baffles of foraminous material connected with the shaft and cylinder and arranged between the convolutions of the spirals, means for rotating the shaft from a movable part of the engine, a pipe connecting the front end of the bore with the carbureter, a pipe connecting the rear end of the bore with the inlet manifold, pipes passing through the tank, a pipe connecting said pipes with the exhaust manifold, a discharge pipe connected with the other ends of the tank pipes, whereby the exhaust gases will pass through the tank pipes and heat the liquid therein and thus heat the explosive mixture passing through the device, means for automatically regulating the flow of exhaust gases through the tank pipes by the temperature of the liquid within the tank and a safety device for permitting the escape of overheated water or steam if the temperature regulating means should fail to act.

4. In combination with an internal combustion engine, including its carbureter and the inlet and exhaust manifolds, a tank attached to the engine and adapted to contain a liquid, said tank having a cylindrical bore, the ends of which are closed, a cylinder of foraminous material arranged in the bore, a shaft passing through the bore, means for supporting the cylinder from the shaft, a fan midway the ends of the shaft and connected with the shaft, a spiral connected with the shaft on each side of the fan and formed of foraminous material, said spirals also being connected with the cylinder, baffles of foraminous material connected with the shaft and cylinder and arranged between the convolutions of the spirals, means for rotating the shaft from a movable part of the engine, a pipe connecting the front end of the bore with the carbureter, a pipe connecting the rear end of the bore with the inlet manifold, pipes passing through the tank, a pipe connecting said pipes with the exhaust manifold, a discharge pipe connected with the other ends of the tank pipes, whereby the exhaust gases will pass through the tank pipes and heat the liquid therein and thus heat the explosive mixture passing through the device, means for automatically regulating the flow of exhaust gases through the tank pipes by the temperature of the liquid within the tank, a safety device for permitting the escape of overheated water or steam if the temperature regulating means should fail to act, such means comprising a small cylinder on the tank and in communication therewith, a spring pressed piston in the cylinder, a valve in the pipe which connects the tank pipes with the exhaust manifold, means for controlling the valve by the movement of the piston and a vent in the small cylinder uncovered by the piston when the piston is raised by the expansion of the water in the tank or by steam, to a certain position.

In testimony whereof I affix my signature.

LOUIS M. FABBRO.